United States Patent
Takamiya et al.

(10) Patent No.: US 10,129,416 B1
(45) Date of Patent: Nov. 13, 2018

(54) IMAGE PROCESSING APPARATUS, CONTROL METHOD FOR IMAGE PROCESSING APPARATUS, AND RECORDING MEDIUM

(71) Applicant: CANON KABUSHIKI KAISHA, Tokyo (JP)

(72) Inventors: Hiroyoshi Takamiya, Abiko (JP); Jun Omata, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/947,600

(22) Filed: Apr. 6, 2018

(30) Foreign Application Priority Data

Apr. 28, 2017 (JP) ................................. 2017-089815

(51) Int. Cl.
*H04N 1/00* (2006.01)
*G06F 3/12* (2006.01)
*G06F 3/041* (2006.01)

(52) U.S. Cl.
CPC ....... *H04N 1/00167* (2013.01); *G06F 3/0416* (2013.01); *G06F 3/1205* (2013.01); *G06F 3/1237* (2013.01); *H04N 1/00209* (2013.01)

(58) Field of Classification Search
None
See application file for complete search history.

(56) References Cited

U.S. PATENT DOCUMENTS

| | | | | |
|---|---|---|---|---|
| 8,427,683 B2 * | 4/2013 | Mitsui | ................... | G06F 3/1254 358/1.14 |
| 2008/0043137 A1 * | 2/2008 | Rikima | .............. | H04N 1/00204 348/364 |
| 2015/0026585 A1 * | 1/2015 | Yoshida | ................ | H04L 67/025 715/740 |
| 2015/0116769 A1 * | 4/2015 | Nakagawa | ............ | G06F 3/0488 358/1.15 |
| 2018/0068345 A1 * | 3/2018 | Hirokawa | .......... | G06Q 30/0251 |

FOREIGN PATENT DOCUMENTS

JP    2014-165771 A    9/2014

* cited by examiner

*Primary Examiner* — John R Wallace
(74) *Attorney, Agent, or Firm* — Canon U.S.A., Inc. IP Division

(57) ABSTRACT

An image processing apparatus is configured to accept an operation instruction from an operation unit of the image processing apparatus and, via a network, an operation instruction from an information processing apparatus. A restriction is set on change in a setting of the image processing apparatus. Whether to permit cancellation of the restriction setting is set. A control is made in such a way that the cancellation of the restriction setting is permitted in a case where the cancellation of the restriction setting is set to be permitted. A control is made in such a way that the cancellation of the restriction setting is not permitted in a case where the cancellation of the restriction setting is set not to be permitted. An instruction from the information processing apparatus is accepted to cancel the restriction setting regardless of the setting of whether to permit the cancellation of the restriction setting.

7 Claims, 19 Drawing Sheets

FIG.4

| *** COPY | | | ? | LOG OUT |
|---|---|---|---|---|
| MAGNIFICATION<br>100% | PAPER<br>1 ⊢ A4 | DENSITY<br>±0 | | NUMBER<br>OF COPIES<br>1 |
| PREVIEW | DOUBLE SIDE: OFF<br>[ OFF \| SINGLE SIDE/DOUBLE SIDE \| DOUBLE SIDE/DOUBLE SIDE \| DOUBLE SIDE/SINGLE SIDE ]<br>N-IN-ONE PRINTING: OFF<br>[ OFF \| 2_1 \| 4_1 ]<br>| | //RESET |
| | | OTHER<br>SETTINGS | | MONOCHROME<br>START<br>COLOR<br>START |
| \<STATUS LINE\> | | | | CHECK<br>STATUS |

FIG.9 — 900

| SETTING/REGISTRATION: MANAGEMENT SETTING: DEVICE MANAGEMENT: LOCK FUNCTION SETTING | | |
|---|---|---|
| LOCK FUNCTION SETTING | | |
| LOCK FUNCTION | ON | — 901 |
| LOCK CANCEL FROM OPERATION UNIT | ON | — 908 |
| | EDIT | — 907 |
| LOCKING OF RESPECTIVE SETTING ITEMS | | |
| SCREEN LOCKING | | |
| SCREEN LOCKING | OFF | — 909 |
| KEY LOCKING | | |
| VOLUME KEY | OFF | — 902 |
| MENU OPERATION LOCKING | | |
| PAPER SETTING | OFF | — 903 |
| DISPLAY SETTING | ON | |
| TIMER SETTING | OFF | |
| NETWORK SETTING | OFF | |
| ACCESSIBILITY SETTING | OFF | |
| COPY SETTING | OFF | |
| PRINTER SETTING | OFF | |
| TRANSMISSION SETTING | OFF | |
| RECEPTION/TRANSMISSION SETTING | OFF | |
| FILE SAVE/USE SETTING | OFF | |
| DEVICE MANAGEMENT | OFF | |
| SECURITY SETTING | OFF | |
| FUNCTION EXECUTION LOCK SETTING | | |
| COPY USE | OFF | — 904 |
| FACSIMILE USE | ON | |
| PRINT USE | OFF | |
| SECURE PRINT USE | OFF | |
| MEDIA PRINT USE | OFF | |
| TRANSMISSION USE | OFF | |
| RECEPTION USE | OFF | |
| JOB SETTING CHANGE LOCK | | |
| COPY JOB EDITING LOCK | ON | — 905 |
| FACSIMILE JOB EDITING LOCK | OFF | |
| SCAN JOB EDITING LOCK | OFF | |
| MEMORY MEDIA EDITING LOCK | OFF | |
| STATUS CHECK SCREEN LOCK | | |
| STATUS CHECK SCREEN HIDING | OFF | — 906 |

FIG.10   *1000*

```
SETTING/REGISTRATION: MANAGEMENT SETTING: DEVICE MANAGEMENT: LOCK FUNCTION SETTING

LOCK FUNCTION SETTING
1003 ──■ LOCK FUNCTION
      ■ LOCK CANCEL FROM OPERATION UNIT
1001 ──────────────────────── OK          CANCEL  ──1002

LOCKING OF RESPECTIVE SETTING ITEMS

SCREEN LOCKING
    □ SCREEN LOCKING

KEY LOCKING
    □ LOCK VOLUME KEY

MENU OPERATION LOCKING
    □ LOCK PAPER SETTING
    ■ LOCK DISPLAY SETTING
    □ LOCK TIMER SETTING
    □ LOCK NETWORK SETTING
    □ LOCK ACCESSIBILITY SETTING
    □ LOCK COPY SETTING
    □ LOCK PRINTER SETTING
    □ LOCK TRANSMISSION SETTING
    □ LOCK RECEPTION/TRANSFER SETTING
    □ LOCK FILE SAVE/USE SETTING
    □ LOCK DEVICE MANAGEMENT SETTING
    □ LOCK SECURITY SETTING

FUNCTION EXECUTION LOCK SETTING
    □ LOCK COPY USE
    ■ LOCK FAX USE
    □ LOCK PRINT USE
    □ LOCK SECURE PRINT USE
    □ LOCK MEDIA PRINT USE
    □ LOCK TRANSMISSION USE
    □ LOCK RECEPTION USE

JOB SETTING CHANGE LOCK
    ■ LOCK COPY JOB EDITING
    □ LOCK FAX JOB EDITING
    □ LOCK SCAN JOB EDITING
    □ LOCK MEMORY MEDIA EDITING

STATUS CHECK SCREEN LOCK
    □ STATUS CHECK SCREEN HIDING

| *** COPY | | | ? | LOG OUT |
|---|---|---|---|---|
| MAGNIFICATION<br>100% | PAPER<br>1 ▭ A4 | DENSITY<br>±0 | | NUMBER<br>OF COPIES<br>1 |
| PREVIEW | DOUBLE SIDE: OFF<br>OFF ▦ ▦ ▦<br>N-IN-ONE PRINTING: OFF<br>OFF 2:1 4:1 | | | //RESET |
| | | | | MONOCHROME<br>START |
| | | OTHER<br>SETTINGS | | COLOR<br>START |
| <STATUS LINE> | | | | CHECK<br>STATUS |

IMAGE PROCESSING APPARATUS, CONTROL METHOD FOR IMAGE PROCESSING APPARATUS, AND RECORDING MEDIUM

BACKGROUND

Technical Field

The present disclosure relates to an image processing apparatus that locks settings, a control method for the image processing apparatus, and a recording medium.

Description of the Related Art

When using an image processing apparatus, a user sets various setting items, such as a type of paper which is put in each paper feed stage and a language to be displayed on a screen, on a touch panel of the image processing apparatus. It is known that settings of the items are locked from an information processing apparatus such as a personal computer (PC) connected to the image processing apparatus in such a manner that the user does not accidentally change setting values of the items after the values are set.

Further, Japanese Patent Application Laid-Open No. 2014-165771 discusses that a user can set whether to lock settings of an image processing apparatus, from an operation unit of the image processing apparatus or an information processing apparatus such as a PC connected to the image processing apparatus.

There are a case where a user seeks to cancel lock of the settings from one of the operation unit of the image processing apparatus and the information processing apparatus such as a PC, and a case where a user seeks to set whether to lock the settings, from both the operation unit of the image processing apparatus and the information processing apparatus such as a PC.

For example, it is conceivable that an image processing apparatus installed in a public facility or in a shop is used by many users. In this case, if the lock of the settings can be cancelled from the operation unit of the image processing apparatus, the following situation arises. Even if the user locks a setting of the image processing apparatus after a value desired to be used has been set, another user cancels the lock of the setting from the operation unit of the image processing apparatus and thus a job is executed in a setting which is not intended by the user who has locked the setting. Therefore, in order to prevent another user from easily cancelling the lock of the setting, it is conceivable that the image processing apparatus is configured in such a manner that the lock of the setting cannot be cancelled from the operation unit of the image processing apparatus may be disabled. That is, it is conceivable that the image processing apparatus is configured in such a manner that the lock of the setting can be cancelled only from an information processing apparatus connected to the image processing apparatus via a network.

On the other hand, an image processing apparatus installed in an office may be used by limited users. In this case, settings of the image processing apparatus are locked in such a manner that a user does not accidentally change setting values. In a case where the lock of the settings can be cancelled only from an information processing apparatus, the user must always cancel the lock of the settings from the information processing apparatus when intentionally using the image processing apparatus in settings different from normal settings. Therefore, such a configuration that the lock of the settings can be cancelled only from the information processing apparatus deteriorates convenience for the user.

SUMMARY

According to an aspect of the present invention, an image processing apparatus includes one or more processors, and memory storing instructions that, when executed by the one or more processors, cause the image processing apparatus to perform operations including: accepting an operation instruction for the image processing apparatus from an operation unit of the image processing apparatus, accepting an operation instruction for the image processing apparatus from an information processing apparatus connected to the image processing apparatus via a network, setting a restriction on change in a setting of the image processing apparatus through an operation of the operation unit, setting whether to permit cancellation of the restriction setting through an operation of the operation unit, making a control in such a way that the cancellation of the restriction setting through an operation of the operation unit is permitted in a case where the cancellation of the restriction setting through an operation of the operation unit is set to be permitted, making a control in such a way that the cancellation of the restriction setting through an operation of the operation unit is not permitted in a case where the cancellation of the restriction setting through an operation of the operation unit is set not to be permitted, and accepting an instruction to cancel the restriction setting from the information processing apparatus regardless of the setting of whether to permit the cancellation of the restriction setting through an operation of the operation unit.

Further features of the present invention will become apparent from the following description of embodiments with reference to the attached drawings.

BRIEF DESCRIPTION OF THE DRAWINGS

FIG. 4 illustrates one example of a "copy" screen to be displayed on the operation unit of the image processing apparatus.

FIG. 9 illustrates one example of a "lock function setting" screen to appear on the display of the information processing apparatus to be connected to the image processing apparatus.

FIG. 10 illustrates one example of a "lock function setting change" screen to appear on the display of the information processing apparatus to be connected to the image processing apparatus.

FIG. 14 illustrates one example of a "copy" screen on which setting values of a copy job are locked.

FIG. 16 is a flowchart illustrating processing to be executed in a case where the image processing apparatus sets a setting lock function to ON.

DESCRIPTION OF THE EMBODIMENTS

Embodiments will be described below with reference to the drawings. In a present embodiment, a copying machine will be described as an example of an image processing apparatus. An image processing apparatus according to the present embodiment is not limited to the copying machine, and the present disclosure is employed for another image processing apparatus such as a scanner or a printer.

Figure 1:
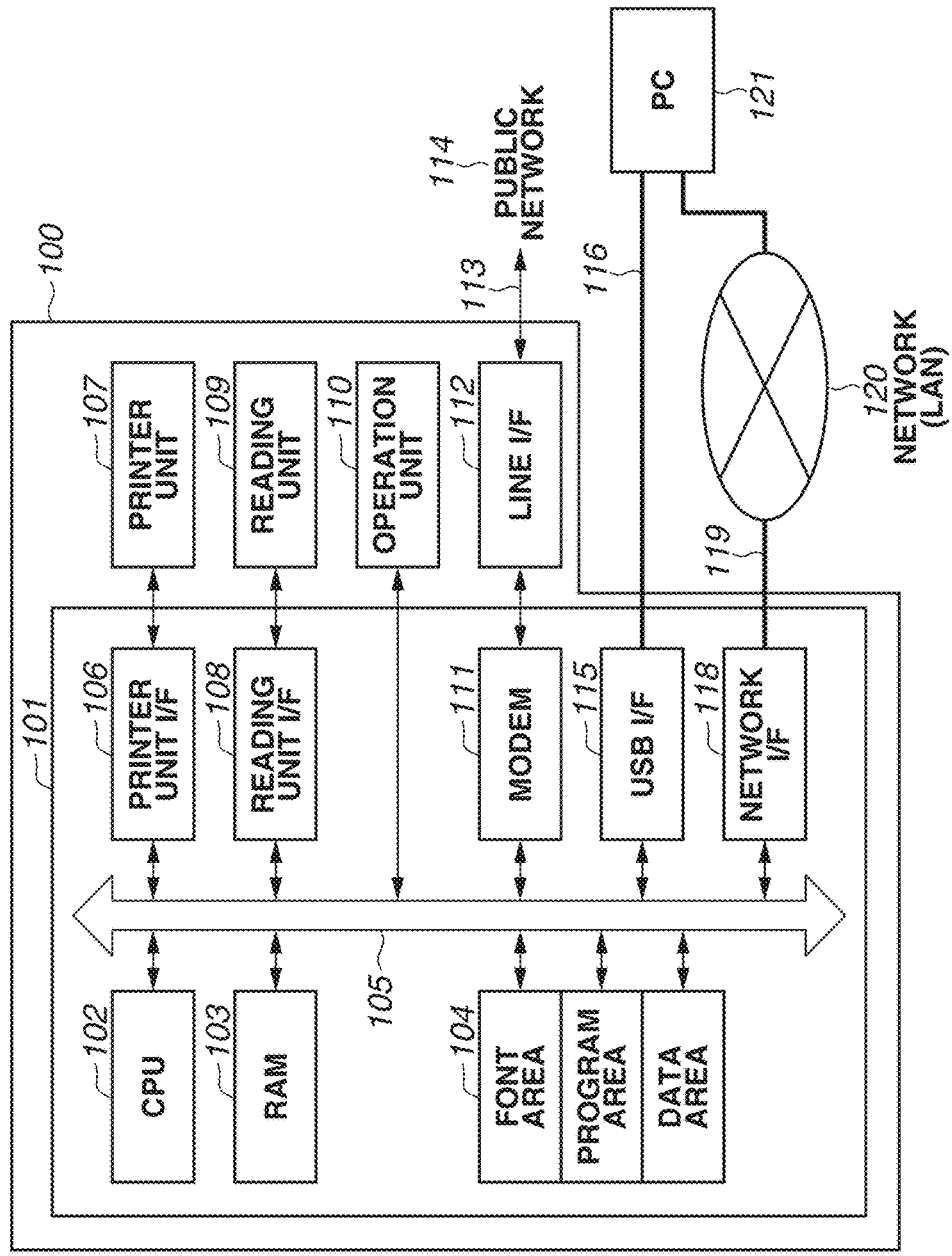
FIG. 1 is a block diagram of an image processing apparatus.

FIG. 1 is a block diagram illustrating a hardware configuration of a copying machine 100 which is an image processing apparatus to an embodiment. Each block indicates a module, and arrows between the blocks represent flows of data or instructions.

The copying machine 100 includes a printer unit 107, a reading unit 109, an operation unit 110, a line interface (I/F) 112, and a controller unit 101 that controls these units.

The controller unit 101 includes a central processing unit (CPU) 102, a random access memory (RAM) 103, a read-only memory (ROM) 104, a printer unit I/F 106, a reading unit I/F 108, a modulator-demodulator (MODEM) 111, a universal serial bus (USB) I/F 115, and a network I/F 118. The respective blocks are connected by a system bus 105.

The CPU 102 comprehensively controls the respective blocks in accordance with various control programs. The various programs are stored in a program area of the ROM 104. The CPU 102 reads and executes the control programs to realize processing. Alternatively, the CPU 102 expands and loads in the RAM 103 compressed data stored in the program area of the ROM 104 to execute the programs. The above-described various control programs may be stored in a compressed state/uncompressed state in a hard disk drive (HDD), which is not illustrated.

The network I/F 118 communicates with a host computer 121 (in the drawing, described as a personal computer (PC): hereinafter, referred to as PC) via a network (local area network (LAN)) 120 or the like. The network I/F 118 and the network 120 are connected to each other by a communication cable such as a LAN cable 119. The MODEM 111 is connected to a public network 114 via the line I/F 112, and communicates with another image forming apparatus, a facsimile machine, or a telephone, which is not illustrated. The line I/F 112 and the public network 114 are connected to each other generally by a telephone line 113 or the like.

The printer unit I/F 106 outputs an image signal to the printer unit 107 (printer engine). Further, the reading unit I/F 108 receives a read image signal from the reading unit 109 (scanner engine). The CPU 102 processes the image signal input from the reading unit I/F 108 to output the processed signal as a recording image signal to the printer unit I/F 106. Therefore, an image based on image data generated by the scanner engine can be printed to be output to a sheet.

The CPU 102 displays texts and symbols on a display unit of the operation unit 110 using font information stored in a font area of the ROM 104. Further, the CPU 102 accepts instruction information from the operation unit 110 which receives an instruction from a user.

Device information about the copying machine 100 and address book information of a user, department management information, and the like are stored in a data area of the ROM 104. The CPU 102 reads information from a data ROM of the ROM 104 or updates the information as needed.

In the block diagram, the reading unit 109 and the printer unit 107 are placed inside the copying machine 100. Each or both of the reading unit 109 and the printer unit 107 may be placed outside the copying machine 100.

Figure 2:
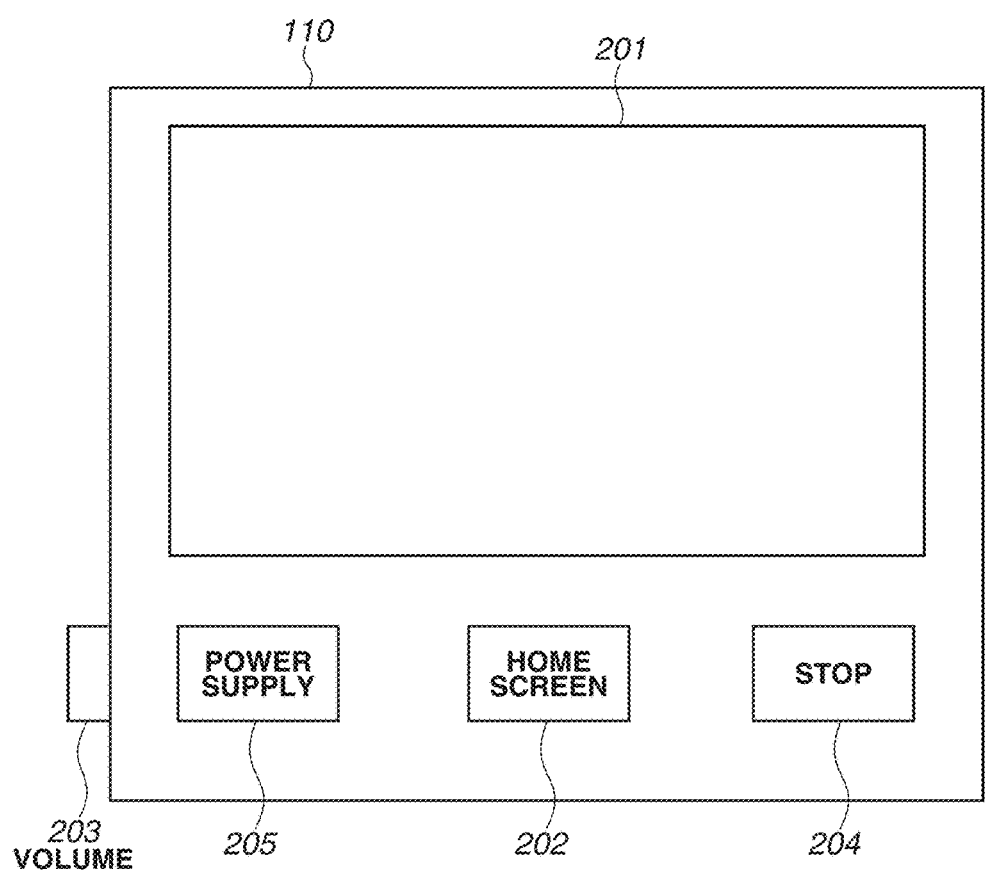
FIG. 2 is a schematic diagram of an operation unit of the image processing apparatus.

FIG. 2 is a schematic diagram of the operation unit 110 provided in the copying machine 100. A touch panel 201 accepts an operation from a user. For example, the touch panel 201 accepts tapping in a manner that a user touches the touch panel 201 using a finer or a stylus and removes the finger or the stylus from the touch panel 201 without sliding the finger or the stylus. Alternatively, the touch panel 201 can accept an operation such as a moving operation for the user moving a finger in a state where the finger is touching the touch panel 201. A method to be used when the touch panel 201 detects the above-descried operations may be a publicly-known method. The touch panel 201 functions as a unit that displays screens. The touch panel 201 displays screens such as a screen for setting the copying machine 100 and a screen for using functions such as printing and scanning functions in accordance with an operation performed by the user.

If the user presses a "home screen" button 202, a "home" screen 300 to be described below, is displayed on the touch panel 201. A "stop" button 204 is used for stopping an active job. A "power" button 205 is used for switching power of the copying machine 100 on or off. In a case where the copying machine 100 detects a tapping operation on the "home screen" button 202, the "stop" button 204, or the "power" button 205, the copying machine 100 executes processing associated with the button where the tapping operation has been detected.

A hardware key 203 is used for adjusting a volume of a speaker, which is not illustrated, provided in the copying machine 100. In the present embodiment, the hardware key 203 will be described as the key for adjusting the volume, but the hardware key 203 may be used for setting another setting value. For example, the hardware key 203 may be used for changing brightness of the touch panel 201. Further, the copying machine 100 may include other hardware keys such as a ten key and a cross key instead of the hardware key 203 in FIG. 2.

FIG. 3 to FIG. 7 illustrate examples of a screen to be displayed on the touch panel 201 of the operation unit 110 according to the present embodiment.

Figure 3:
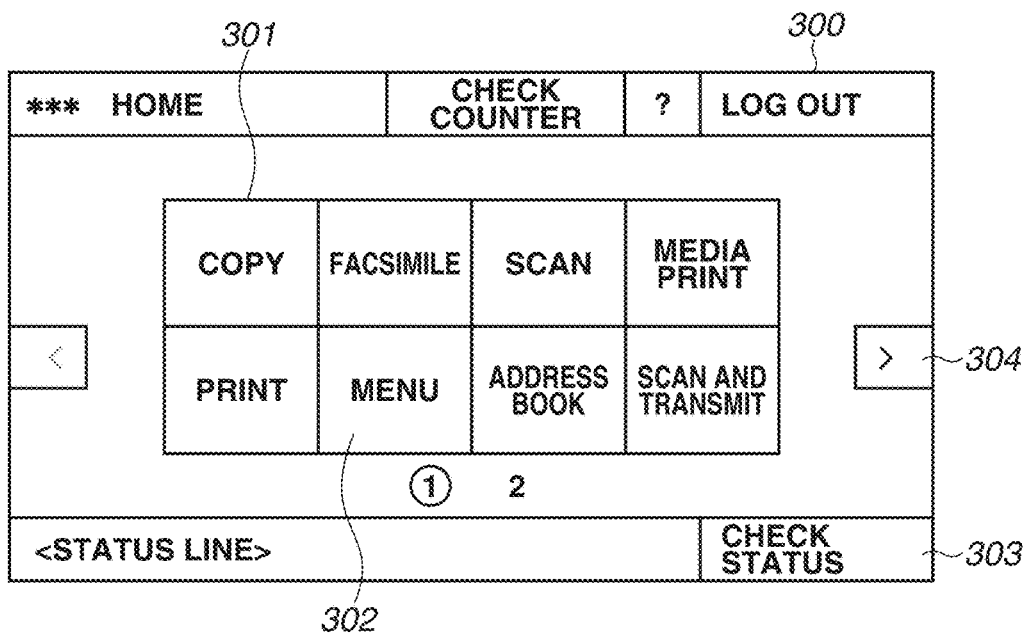
FIG. 3 illustrates one example of a "home" screen to be displayed on the operation unit of the image processing apparatus.

FIG. 3 illustrates one example of the "home" screen 300 to be displayed on the touch panel 201 according to the present embodiment. After the copying machine 100 is powered on, the "home" screen 300 is first displayed on the touch panel 201. Further, the "home" screen 300 is displayed on the touch panel 201 when a user taps the "home screen" button 202. An icon of a function to be used by the user of the copying machine 100 is displayed on the "home" screen 300. The copying machine 100 according to the present embodiment has a copying function in which the printer unit 107 prints the image data generated by reading a document through the reading unit 109, and a facsimile/transmission function of transmitting the image data generated by reading a document through the reading unit 109 via the public network 114. Further, the copying machine 100 includes a print function in which the printer unit 107 prints image data received from the PC 121, and a media print function in which the printer unit 107 prints image data read from an external memory such as a USB. Further, the copying machine 100 includes a scanning function of storing the image data generated by reading a document through the reading unit 109 in a storage device, which is not illustrated, and transmitting the image data to the PC 121. The "home" screen 300 in FIG. 3 has two pages. A "home" screen on which functions, which are not illustrated in FIG. 3, can be selected is displayed on the touch panel 201 when a user taps a button 304.

A "check status" button 303 is used for displaying, on the touch panel 201, a job execution status and information about paper and toner set in the copying machine 100.

A method in which a user sets the copying function in the copying machine 100 will be described with reference to FIG. 4.

In a case where the user taps a "copy" icon 301 on the "home" screen 300, a "copy" screen 400 is displayed on the touch panel 201. The "copy" screen 400 is used for setting a value when the user uses the copying function. A "magnification" button 401 is used when the user sets magnification in a case where the image data generated by reading the document through the reading unit 109 is printed on paper. A "single-side/double-side setting" button 402 is used for the user to set whether a document to be read by the reading unit 109 is a double-side printed or single-side printed document, or to set whether the printer unit 107 performs one-side printing or double-side printing. A "monochrome start" button 403 is used for the user to give an instruction of start of monochrome copying, and a "color start" button 407 is used for the user to give an instruction of start of color copying. A "paper" button 404 is used for the user to set paper to be used for printing in the printer unit 107. A "density" button 405 is used for the user to set density for printing in the printer unit 107. A "number of copies" button 406 is used for the user to set a number of copies for printing in the printer unit 107. An "N-in-one printing" button 408 is used for the user to set printing in a state that a plurality of documents read by the reading unit 109 is converted into one piece of paper. For example, if "2_1" is selected, the copying machine 100 converges image data on two pages read by the reading unit 109 into one page and the printer unit 107 prints the image data. The user taps the above-descried buttons to change the settings of the copy or to give an instruction of the start of the print processing.

In a case where the user taps the "copy" icon 301 on the "home" screen 300, the settings of the copy screen displayed on the touch panel 201 can be set by a method, which is not illustrated. For example, if the user taps the "copy" icon 301 on the "home" screen 300, the "copy" screen 400 in a state that the N-in-one printing is always set to "2_1" can be displayed on the touch panel 201.

Figure 5:
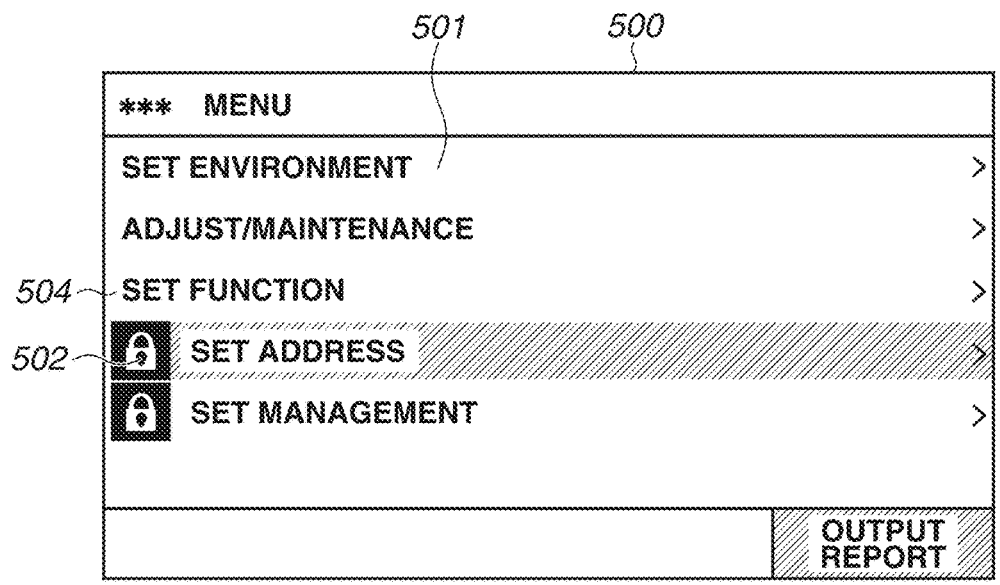
FIG. 5 illustrates one example of a "menu" screen to be displayed on the operation unit of the image processing apparatus.

FIG. 5 illustrates one example of a "menu" screen 500 to be displayed on the touch panel 201 when the user taps a "menu" icon 302 on the "home" screen 300. The "menu" screen 500 is used for entire settings of the copying machine 100. For example, if a user taps "set environment" 501, the user can set a language to be used on a screen to be displayed on the touch panel 201, and can register a type of paper to be set on a feed tray of the copying machine 100. Further, on "set environment" 501, the user can set a time during a transition of the copying machine 100 from a normal operation mode to a power-saving mode. Setting items that can be set only by an administrator of the copying machine 100 are displayed with a key mark 502. If the user taps a setting item with the key mark 502, an authentication screen, which is not illustrated, is displayed on the touch panel 201. The user inputs a user ID and a password of the administrator to log into the copying machine 100. Thereafter, the user changes the setting of the selected setting item.

Figure 6:
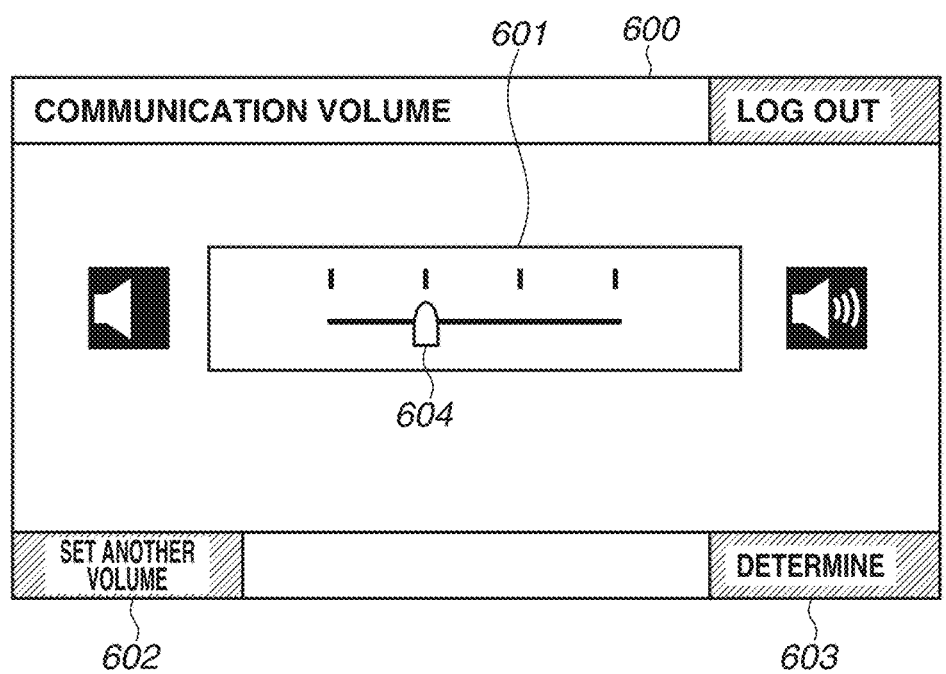
FIG. 6 illustrates one example of a "communication volume setting" screen to be displayed on the operation unit of the image processing apparatus.

FIG. 6 illustrates one example of a screen to be displayed on the touch panel 201 in a case where a user presses the hardware key 203. If the user presses the hardware key 203 in a state where the "home" screen 300 or the "copy" screen 400 is being displayed on the touch panel 201, a "communication volume setting" screen 600 is displayed on the touch panel 201. The "communication volume setting" screen 600 is used for the user to set a volume of a communication sound during facsimile transmission and reception. If the user taps any position of a volume setting bar 601, a slider 604 moves to the tapped position to change the volume of the communication sound. If the user taps a position close to a left end of the volume setting bar 601, the volume is set to be low. If the user taps a position close to a right end of the volume setting bar 601, the volume is set to be high. An "another volume setting" button 602 is used for the user, for example, to set a volume of another sound such as an operation sound. An "OK" button 603 is used for the user to determine the set volume. In another method, the user drags the slider 604 to the right or left in a state where the slider 604 is being touched, to be capable of changing the volume.

Figure 7:
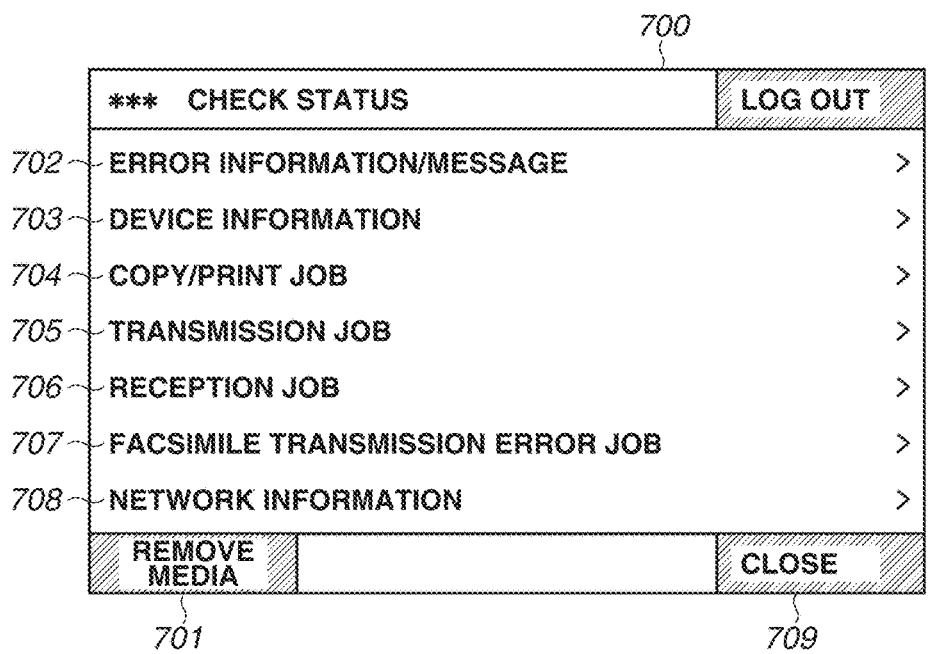
FIG. 7 illustrates one example of a "status check" screen to be displayed on the operation unit of the image processing apparatus.

FIG. 7 illustrates one example of a "check status" screen 700 to be displayed on the touch panel 201 in a case where a user taps the "check status" button 303 on the "home" screen 300. The "check status" screen 700 is used for checking a status of a job to be executed by the copying machine 100, error information, a serial number of the device, and the like. If the user taps "error information/message" 702, error information about the copying machine 100 and information about consumable products are displayed on the touch panel 201. The error information is information relating to, for example, toner shortage or paper shortage occurring in the copying machine 100. The information about consumable products is information relating to, for example, a type of paper set on the feed tray and a remaining amount of toner. If the user taps "device information" 703, information such as a serial number of the copying machine 100 is displayed on the touch panel 201. If the user taps "copy/print job" 704, "transmission job" 705, "reception job" 706, and "facsimile transmission error job" 707, execution statuses of various jobs and error information relating to various jobs are displayed on the touch panel 201. The job execution status is, for example, execution date and time of an executed job, a status of whether the job has been normally executed, and information about an unexecuted job stored in the copying machine 100. If the user taps "network information" 708, information about a network such as an internet protocol (IP) address or a service set identifier (SSID) is displayed on the touch panel 201. A "remove media" button 701 is used for removing a USB device or the like mounted on the copying machine 100. A "close" button 709 is used for ending the display of the "check status" screen 700 to display the "home" screen 300 on the touch panel 201.

In the present embodiment, a method for locking the settings of the copying machine 100 will be described. In this specification, to lock the settings includes a situation where a user cannot set the respective setting items from the operation unit. For example, even if the user taps a locked setting item on the touch panel, the user cannot set the item. The user sets whether to lock the settings of the copying machine 100 from the touch panel 201 or the PC 121. Further, among the items which can be set in the copying machine 100, the user sets, from the PC 121, any items whose settings are to be locked.

Figure 8:
FIG. 8 illustrates one example of a "device management" screen to appear on a display of an information processing apparatus to be connected to the image processing apparatus.

With reference to FIG. 8 to FIG. 10, a method will be described in which a user locks settings from the PC 121 and sets an item whose setting is to be locked. Screens illustrated in FIG. 8 to FIG. 10 are transmitted in Hypertext Markup Language (HTML) format to the PC 121 or the like of a client via the USB I/F 115 and the network I/F 118. The PC 121 displays, on a display of the PC 121, a screen to be generated based on the received information as a web page on a web browser.

FIG. 8 illustrates a "device management" screen 800 of the copying machine 100 to appear on the display of the PC 121. On "device management" screen 800, a user makes the entire settings of the copying machine 100. If the user moves a mouse to "set lock function" 801 and clicks there, a "set lock function" screen 900 in FIG. 9 appears on the display of the PC 121.

FIG. 9 illustrates one example of the "set lock function" screen 900 indicating whether the setting lock function is ON/OFF, and whether, if the setting lock function is set to ON, the settings of the respective items are locked. Items whose settings can be locked and values of lock flags for the settings of the items are displayed on the "set lock function" screen 900.

A setting lock function flag 901 represents whether the lock function of the setting values of the copying machine 100 is set to ON. If the setting lock function flag 901 is set to "ON", a user cannot set the preset values of the items. If the setting lock function flag 901 is set to "OFF", the user can set the values of the respective items of the copying machine 100.

A lock cancel from operation unit flag 908 is used for setting whether the setting lock function flag 901 can be set to OFF from the touch panel 201 of the copying machine 100. If the lock cancel from operation unit flag 908 is set to "ON", the user can cancel the setting lock function from the touch panel 201. If the lock cancel from operation unit flag 908 is set to "OFF", the user cannot cancel the setting lock function from the touch panel 201. For this reason, if the lock cancel from operation unit flag 908 is set to "OFF", the user accesses from the PC 121 to the copying machine 100 to cancel the setting lock function.

A screen lock flag 909 is a flag for setting whether operations from the operation unit 110 are not accepted with no exception. For example, the setting lock function flag 901 and the screen lock flag 909 are supposed to be set to "ON".

At this time, even if the user operates the touch panel 201, the "power" button 205, the "home screen" button 202, the "stop" button 204, or the hardware key 203, the user cannot operate the copying machine 100. If the screen lock flag 909 is set to "ON", the copying machine 100 does not accept a touch operation from the user, but can execute print processing based on image data received from the PC 121.

A key lock flag 902 represents whether a value of a setting item associated with the hardware key 203 can be set. In the present embodiment, the hardware key 203 is used for setting a setting value of a volume. For this reason, if the key lock flag 902 is set to "ON", the user cannot set the setting value of the volume. On the other hand, if the key lock flag 902 is set to "OFF", the screen 600 in FIG. 6 is displayed on the touch panel 201 when user presses the hardware key 203, and the user can set the setting value of the volume.

A menu operation lock flag 903 represents whether a user can set a value of an item which can be set on the "menu" screen 500. The menu operation lock flag 903 is provided for each item which can be set on the "menu" screen 500. As to a setting item whose menu operation lock flag 903 is set to "ON", the user cannot change its setting value. As to a setting item whose menu operation lock flag 903 is set to "OFF", even if the setting lock function is set to "ON", the user can set its setting value. Some examples of the item which can set on the "menu" screen 500 will be described. A setting item having the menu operation lock flag 903 in FIG. 9 can be set when "set environment" 501 or "set function" 504 on the "menu" screen 500 is tapped. For example, "set paper" is an item for setting a type of paper set on the feed tray of the copying machine 100. "Set display" is an item for setting a language of a screen to be displayed on the touch panel 201 of the copying machine 100. Furthermore, the menu operation lock flag 903 manages whether a value of a setting item relating to each function such as copying and printing can be set.

A function execution lock flag 904 is a flag for setting whether a user can use each function. For example, if "use facsimile" is set to "ON", the setting is locked so that a user cannot use the facsimile function. Therefore, even if the user taps a "facsimile" icon 305 on the "home" screen 300, a "facsimile" screen, which is not illustrated, is not displayed on the touch panel 201. Therefore, the user cannot use the facsimile function. On the other hand, if "use copy" is set to "OFF", the user taps the "copy" icon 301 on the "home" screen 300 to be capable of using the copying function. As described above, a use prohibition function can be set by setting the function execution lock flag 904.

A job setting change lock flag 905 represents whether a user can set the setting values of the respective functions. For example, if "copy job editing lock" is set to "ON", the user cannot change the settings of the "copy" screen 400 to be displayed when the user taps the "copy" icon 301 on the "home" screen 300. Therefore, the user can use the copying function only in predetermined setting.

A status check screen lock flag 906 represents whether the "check status" screen 700 is displayed on the touch panel 201 when a user taps the "check status" button 303 of the "home" screen 300. In a case where the status check screen lock flag 906 is set to ON, even if the user taps the "check status" button 303, the "check status" screen 700 is not displayed on the touch panel 201.

An "edit" button 907 is used for editing the settings of the setting lock flags. If a user positions a pointer of the mouse connected to the PC 121 over the "edit" button 907 and clicks it, a "lock function setting change" screen 1000 in FIG. 10 appears on the display of the PC 121.

The copying machine 100 can be operated in a mode in which the setting lock function can be canceled from the PC 12 and the operation unit 110 and in a mode in which the setting lock function can be canceled only from the PC 121, by providing the lock cancel from operation unit flag 908. A user who uses the copying machine 100 cannot cancel the lock of the settings from the operation unit 110 by setting the lock cancel of the setting from the operation unit to OFF. Such setting can prevent the user from cancel the setting lock function from the operation unit 110 and setting a setting value. On the other hand, if the setting lock cancel function is set to ON from the operation unit, the user who uses the copying machine 100 can cancel the lock of the setting from the operation unit 110. In a case where the setting value to be normally used is locked, a user who seeks to use the copying machine 100 in settings different from normal settings can cancel the setting lock function from the operation unit 110 to set a setting value.

FIG. 10 illustrates one example of the "lock function setting change" screen 1000 on which a user sets through the PC 121 whether the setting of each item is locked. The "lock function setting change" screen 1000 includes a check box 1003 for setting whether the setting of each item is locked, an "OK" button 1001, and a "cancel" button 1002. If a user clicks the check box 1003, the check box of each setting item is highlighted. The setting item whose check box is highlighted is a setting item whose setting lock is "ON".

The "OK" button 1001 is used for giving an instruction to execute processing for storing a value set on the "lock function setting change" screen 1000 in the RAM 103. If the "OK" button 1001 is clicked in a state where the check box 1003 of the "lock function" is being highlighted, the setting lock function flag 901 is set to ON. If the "OK" button 1001 is clicked in a state where the checkbox of the "lock function" is not being highlighted, the setting lock function flag 901 is set to OFF.

The "cancel" button 1002 is used for cancelling the setting displayed on the "lock function setting change" screen 1000, and using setting before the "lock function setting change" screen 1000 is displayed. For example, if the "OK" button 1001 is clicked in a state illustrated in FIG. 10, values of five setting items whose check boxes are highlighted cannot be set.

Figure 11:
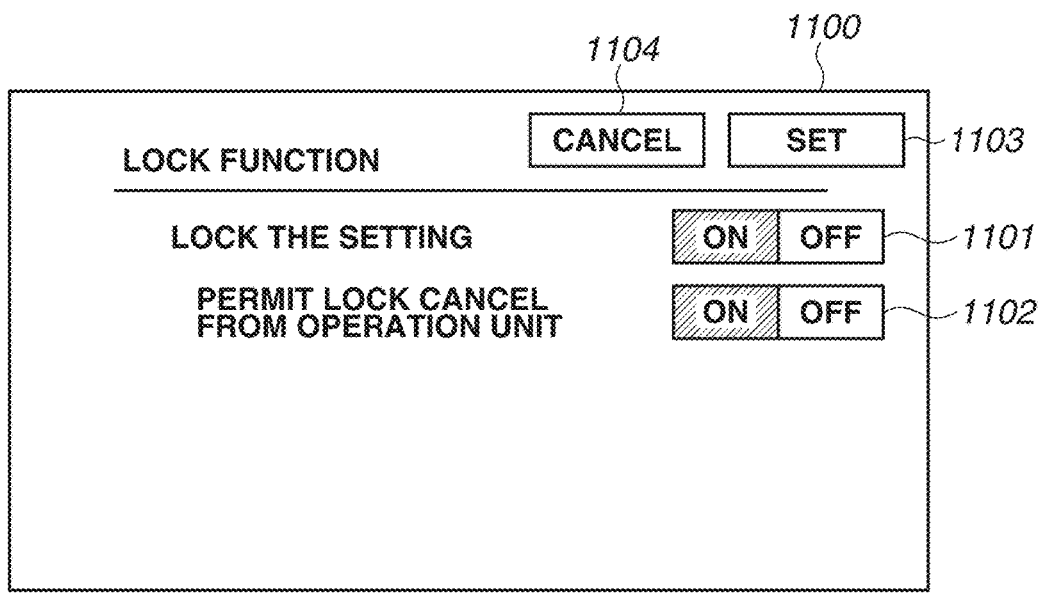
FIG. 11 illustrates one example of a "lock function" screen to be displayed on the operation unit of the image processing apparatus.

A method of locking and cancelling the settings using the operation unit 110 will be described below with reference to FIG. 11. FIG. 11 illustrates one example of a "lock function" screen 1100 to be displayed on the touch panel 201 of the operation unit 110. The copying machine 100 accepts a user operation via the "lock function" screen 1100, and sets the setting lock function to ON or OFF.

The "lock function" screen 1100 is displayed on the touch panel 201 when a user taps "set environment" on the "menu" screen 500 to select the "lock function" on a screen, which is not illustrated.

On the "lock function" screen 1100, a user sets whether a setting is locked. A "lock function" switch 1101 is used when the user sets whether a setting value cannot be set. If the "lock function" switch 1101 is "ON", the user cannot set a value of an item whose setting value lock fag is set to "ON" on the "lock function setting change" screen 1000 in FIG. 10. If the "lock function" switch 1101 is "OFF", the user can set values of any setting items. A switch 1102 is a switch with which the user sets whether the setting lock function can be set to "OFF" from the operation unit when setting the "lock function" switch 1101. If the switch 1102 is set to "ON", the user makes the "lock function" screen 1100 appear on the touch panel 201 and can set the "lock function" switch 1101 to "OFF". If the switch 1102 is set to "OFF", the user cannot set the setting lock function to OFF from the "lock function" screen 1100 of the touch panel 201.

Further, while the setting lock function is "ON", the switch 1102 is grayed out and thus the setting value cannot be changed.

A "set" button 1103 is a button with which a user gives an instruction to execute processing for storing the setting made on the "lock function" screen 1100 in the RAM 103. A "cancel" button 1104 is used for giving an instruction to cancel the setting made on the "lock function" screen 1100.

If the setting lock is set, screens to be displayed on the touch panel 201 will be described with reference to FIG. 12 to FIG. 15B.

Figure 12:
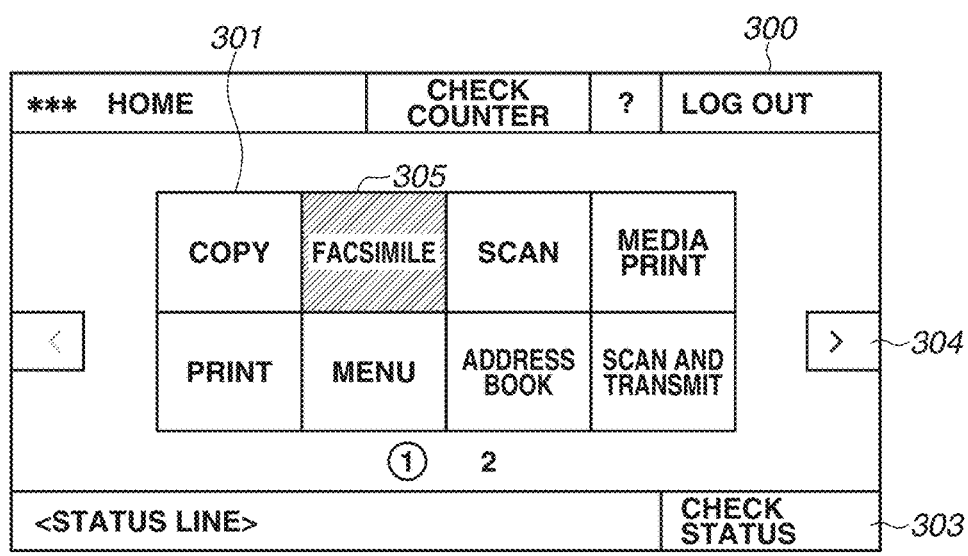
FIG. 12 illustrates one example of the "home" screen on which execution of a facsimile function is restricted.

FIG. 12 illustrates the "home" screen 300 to be displayed on the touch panel 201 in a case where the setting lock function flag 901 and the use of a facsimile of the function execution lock flag 904 are set to ON, namely, the setting is locked. In the above-described setting, the "facsimile" icon 305 is grayed out, and thus a user cannot use the facsimile function.

Figure 13:
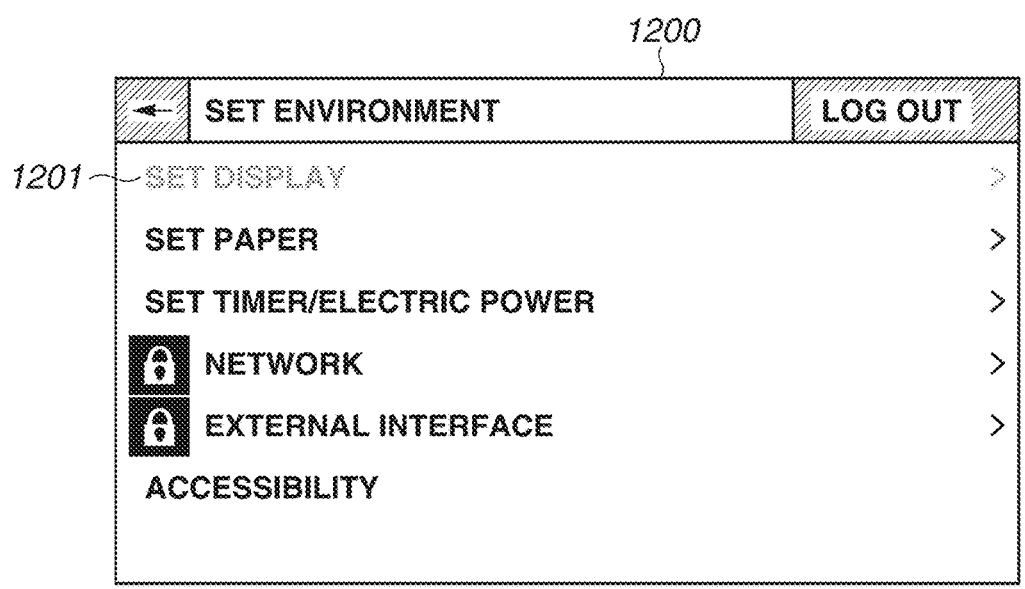
FIG. 13 illustrates one example of a "set environment" screen on which a value of a display setting is locked.

FIG. 13 illustrates one example of a "set environment" screen 1200 to be displayed on the touch panel 201 in a case where the setting lock function flag 901 and "set display" of the menu operation lock flag 903 are set to ON. If a user taps "set environment" 501 of the "menu" screen 500, the "set environment" screen 1200 is displayed on the operation unit. A value of "set display" is locked and grayed out, and thus the user cannot set a value of "set display".

FIG. 14 illustrates one example of a copy screen to be displayed on the touch panel 201 in a case where the setting lock function flag 901 and "copy job editing lock" of the job setting change lock flag 905 are set to ON. If "copy job editing lock" is set to ON, a user cannot set a setting value for use of the copying function. For this reason, all the setting values of the "magnification" button 401, the "paper" button 404, the "density" button 405, the "number of copies" button 406, the "single-side/double-side setting" button 402, and the "N-in-one printing" button 408 are grayed out. The user taps the "monochrome start" button 403 and the "color start" button 407 to give an instruction to start the copy job.

Figure 15A:
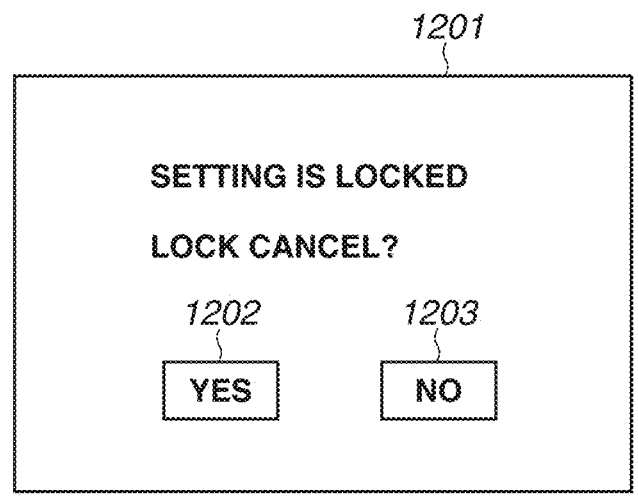
FIGS. 15A and 15B illustrate examples of screens to be displayed on the operation unit of the image processing apparatus in a case where a user performs tapping on an item whose setting value is locked.
Figure 15B:
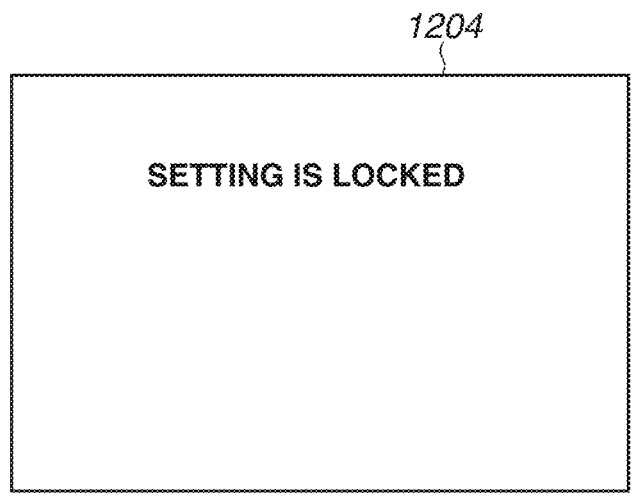

FIGS. 15A and 15B illustrate examples of screens to be displayed on the touch panel 201 of the copying machine 100 in a case where a user sets a value of a locked setting item. FIG. 15A illustrates the screen to be displayed on the touch panel 201 in a case where lock cancel from the operation unit is set to "ON". A "Yes" button 1202 is used for setting the setting lock function to "OFF" to permit a setting of a setting value. When a "No" button 1203 is pressed, the setting lock function remains "ON", and thus the user still cannot set a setting value.

FIG. 15B illustrates the screen to be displayed on the touch panel 201 in a case where the lock cancel from operation unit flag 908 is set to "OFF". If a user taps an item whose setting is locked, a screen 1204 is displayed on the touch panel 201. The screen 1204 is used for notifying the user that a setting value cannot be set. In FIG. 15B, a message "the setting is locked" is displayed on the touch panel 201, but the message to be displayed on the touch panel 201 is not limited to this. For example, a message "the setting of the setting item cannot be made" may be displayed on the touch panel 201.

Processing to be executed by the copying machine 100 when a setting is locked will be described with reference to a flowchart in FIG. 16. A program for executing the processing in the flowchart is stored in the ROM 104. The processing is realized when the CPU 102 reads and executes the program stored in the ROM 104.

Figure 16:
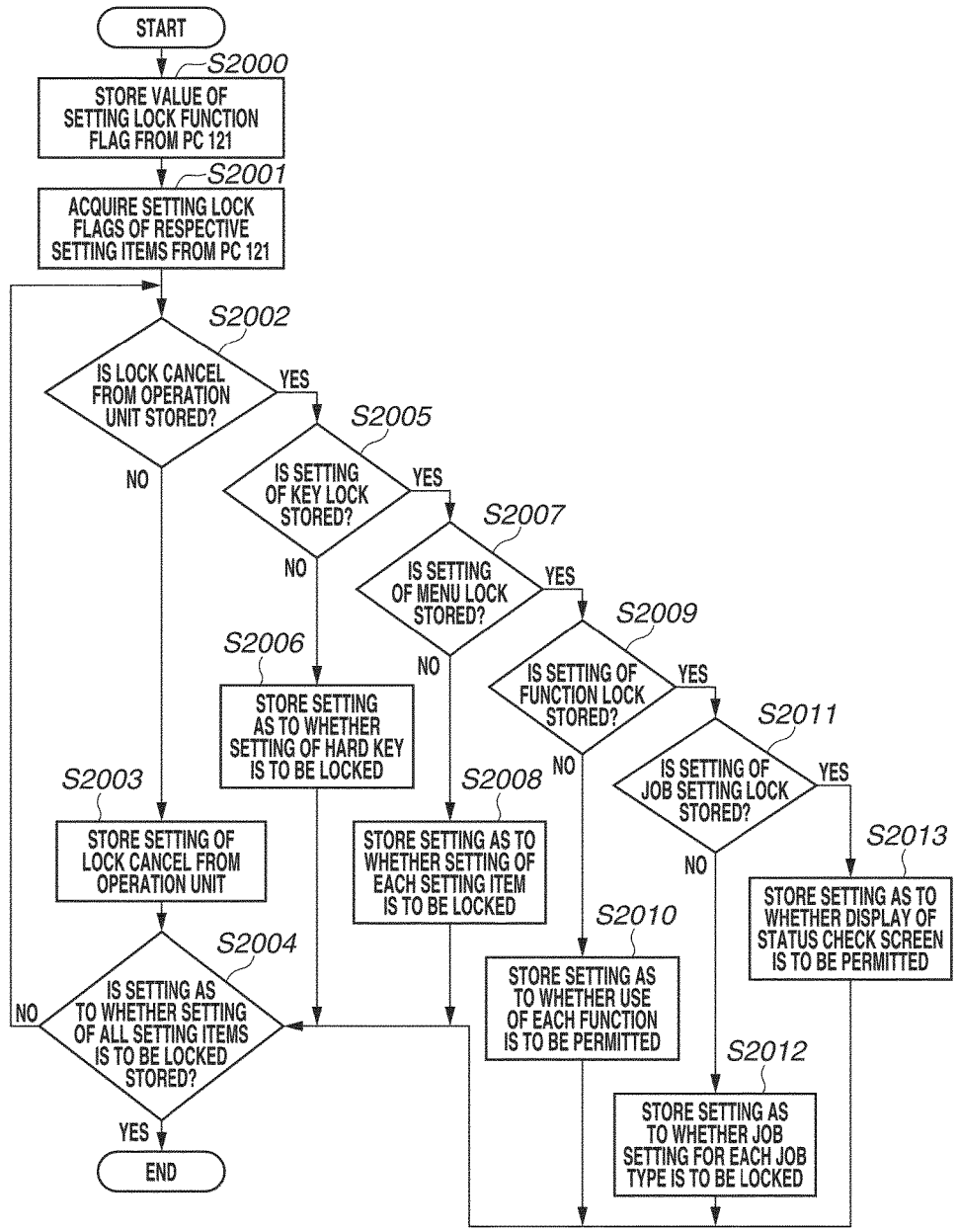

The processing in FIG. 16 starts when the CPU 102 receives via a network I/F 116 a signal representing that the "OK" button 1001 of the "lock function setting change" screen 1000 is clicked.

The CPU 102 acquires a value of the setting lock function flag 901 from the PC 121 and stores the value in the RAM 103 (step S2000).

Thereafter, in step S2001, the CPU 102 acquires lock flags of the settings of the respective items from the PC 121.

In step S2002, the CPU 102 determines whether the setting of lock cancel from the operation unit has been stored in the RAM 103.

If the setting of lock cancel from the operation unit has not been stored in the RAM 103 (No in step S2002), the CPU 102 stores the setting of lock cancel from the operation unit in the RAM 103 in step S2003. The CPU 102 refers to the lock cancel from operation unit flag 908 to store the value of the lock cancel from the operation unit flag 908 in the RAM 103.

In step S2004, The CPU 102 determines whether the values of all the items set on the "lock function setting change" screen 1000 have been stored. If the values of all the setting items are stored in the RAM 103 (Yes in step S2004), the CPU 102 ends the processing described in this flowchart. If the items set on the "lock function setting change" screen 1000 include an item whose setting value has not been stored, the processing returns to step S2002.

In step S2002, if the setting of lock cancel from the operation unit is stored in the RAM 103 (Yes in step S2002), the CPU 102 determines whether key lock setting has been stored in the RAM 103 in step S2005. If the key lock setting has not been stored in the RAM 103 (No in step 2005), the CPU 102 refers to the key lock flag 902 to store a setting value of the key lock flag 902 in the RAM 103 in step S2006. The CPU 102 executes processing in step S2006, and the processing proceeds to step S2004.

In step S2005, if the key lock setting is stored in the RAM 103, (Yes in step S2005) the CPU 102 determines whether a setting relating to locking of a menu operation has been stored in the RAM 103 in step S2007. If the setting relating to the locking of the menu operation has not stored in the RAM 103 (No in step S2007), the CPU 102 refers to the menu operation lock flag 903. In step S2008, the CPU 102 stores, in the RAM 103, whether the settings of items that can be set on the "menu" screen 500 are locked. The CPU 102 ends the processing in step S2008, and the processing proceeds to step S2004.

In step S2007, if the setting relating to the locking of the menu operation is stored in the RAM 103 (Yes in step S2007), the CPU 102 determines whether a setting of the function execution lock is stored in the RAM 103 in step S2009. If the setting of the function execution lock is not stored in the RAM 103 (No in step S2009), the CPU 102 refers to the function execution lock flag 904 for each type of jobs. Thereafter, in step S2010, the CPU 102 stores in the RAM 103 whether the execution of the respective functions is permitted. After the processing in step S2012 is completed, the processing proceeds to step S2004.

In step S2009, if the setting of the function execution lock is stored in the RAM 103 (Yes in step S 2009), the CPU 102 determines whether the setting of job setting change lock is stored in the RAM 103 in step S2011. If the setting of job setting change lock is not stored in the RAM 103 (No in step S2011), the CPU 102 stores a setting value of the job setting change lock flag 905 in the RAM 103 in step S2012. After the processing in step S2012 is completed, the CPU 102 executes the processing in step S2004.

In S2011, if the job setting change lock is stored in the RAM 103 (Yes in step S2011), the CPU 102 stores a value of the status check screen lock flag 906 in the RAM 103 in step S2013. After the CPU 102 executes the processing in S2013, the processing returns to step S2004.

In the flowchart in FIG. 16, in step S2001, the CPU 102 obtains setting value lock flags of the respective setting items from the PC 121. However, in steps S2003, S2006, S2008, S2010, S2012, and S2013, the CPU 102 may obtain setting lock flags of setting items to be stored in the RAM 103, from the PC 121.

The image processing apparatus executes the processing in FIG. 16 to be capable of controlling the setting lock based on an instruction received from an information processing apparatus.

Figure 17:
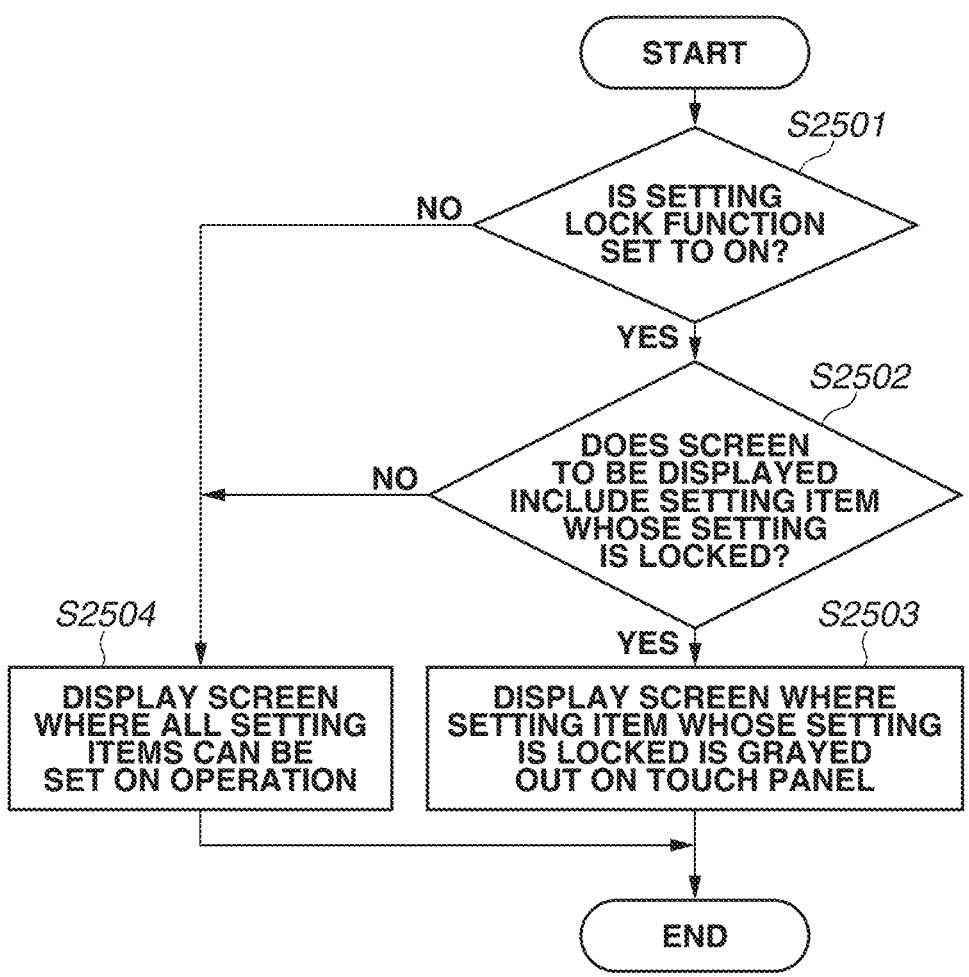
FIG. 17 is a flowchart that illustrates processing to be executed in a case where the image processing apparatus displays a screen on the operation unit.

FIG. 17 is a flowchart illustrating processing to be executed in a case where the copying machine 100 displays a screen. A program for executing the processing described in the flowchart is stored in the ROM 104. The CPU 102 reads the program from the ROM 104 and executes the program to realize the processing.

In step S2501, the CPU 102 determines whether the setting lock function is set to "ON". The CPU 102 determines whether the setting lock function flag 901 stored in the RAM 103 indicates "ON". If the setting lock function flag 901 indicates "OFF" (No in step S2501), the CPU 102 displays, on the touch panel 201, a screen on which a user can set all items to be displayed. If the setting lock function flag 901 is set to "ON", the CPU 102 determines whether the screen to be displayed includes an item whose setting is locked in step S2502. The CPU 102 checks a value of a setting lock flag of the setting item included in the screen to be displayed. For example, in a case where the "home" screen 300 is displayed on the touch panel 201, the CPU 102 refers to the function execution lock flag 904 and a status check screen display flag. If the flags of all the item flags to be displayed on the screen are set to "OFF", the CPU 102 executes the processing in step S2504.

If any of the setting lock flags of the setting items is set to "ON", the CPU 102 displays, on the touch panel 201, a screen on which items whose settings have been locked are grayed out in step S2503. For example, "lock facsimile use" on the function execution lock flag 904 is set to "ON", the CPU 102 displays, on the touch panel 201, the "home" screen 300 on which the "facsimile" icon 305 in FIG. 12 is grayed out. In the present embodiment, an item whose setting is locked is grayed out, but any display format may be used as long as the status that the setting is locked can be recognized. For example, the item whose setting is locked may be displayed in a state where a predetermined mark is added to the setting item.

After executing step S2503, the CPU 102 ends the processing in the flowchart.

Figure 18:
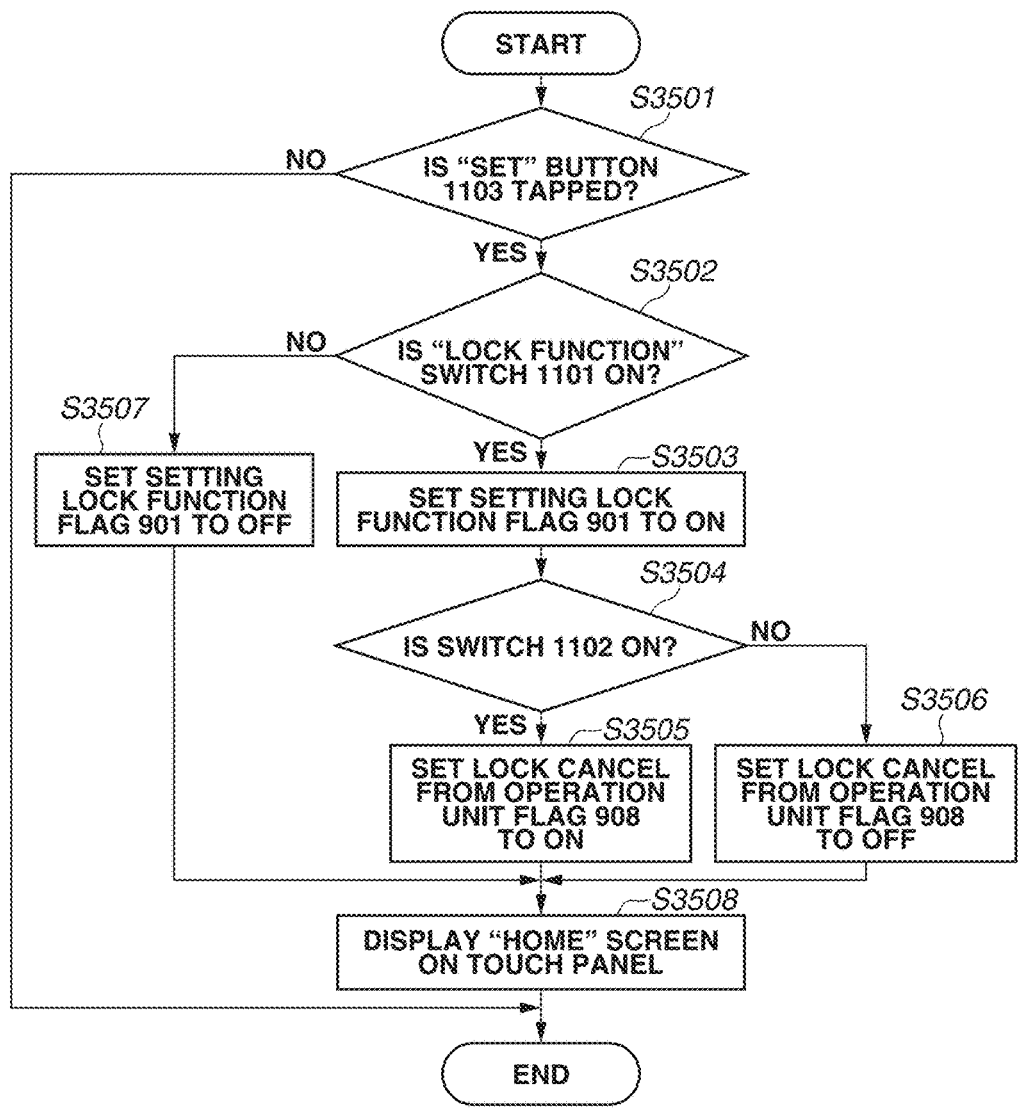
FIG. 18 is a flowchart that illustrates processing to be executed in a case where the setting lock function is turned on by the operation unit of the image processing apparatus.

FIG. 18 illustrates processing to be executed by the CPU 102 in a case where the "set" button 1103 is tapped on the "lock function" screen 1100 in the copying machine 100. A program for executing the processing is stored in the ROM 104, and the CPU 102 executes the program to realize the processing.

In step S3501, the CPU 102 determines whether the "set" button 1103 has been tapped. If the "set" button 1103 has not been tapped (No in step S3501), the CPU 102 ends the processing in the flowchart. In other words, the "lock function" screen 1100 continues to be displayed on the touch panel 201.

If the "set" button 1103 has tapped (Yes in step S3501), the CPU 102 determines whether the "lock function" switch 1101 is ON in step S3502. If the "lock function" switch 1101 is OFF (No in step S3502), the CPU 102 sets a value of the setting lock function flag 901 stored in the RAM 103 to OFF and executes processing in step S3508, which is described below in step S3507.

If the "lock function" switch 1101 has been set to ON (Yes in step S3502), the CPU 102 sets a value of the setting lock function flag 901 stored in the RAM 103 to ON in step S3503.

The CPU 102 determines whether a value of the switch 1102 is ON (step S3504). If the value of the switch 1102 is OFF (No in step S3504), the CPU 102 sets the lock cancel from operation unit flag 908 stored in the RAM 103 to OFF (step S3506). Thereafter, the CPU 102 executes step S3508, which is described below.

If the value of the switch 1102 is ON (Yes in step S3504), the CPU 102 sets the lock cancel from operation unit flag 908 stored in the RAM 103 to ON in step S3505.

The CPU 102 executes processing in FIG. 17 to display the "home" screen 300 in step S3508. In FIG. 18, in step S3508, the CPU 102 displays the "home" screen 300 on the touch panel 201, but the CPU 102 may display another screen on the touch panel 201.

The image processing apparatus executes the processing in FIG. 18 so as to be capable of controlling the setting lock from the operation unit 110 of the image processing apparatus.

Figure 19:
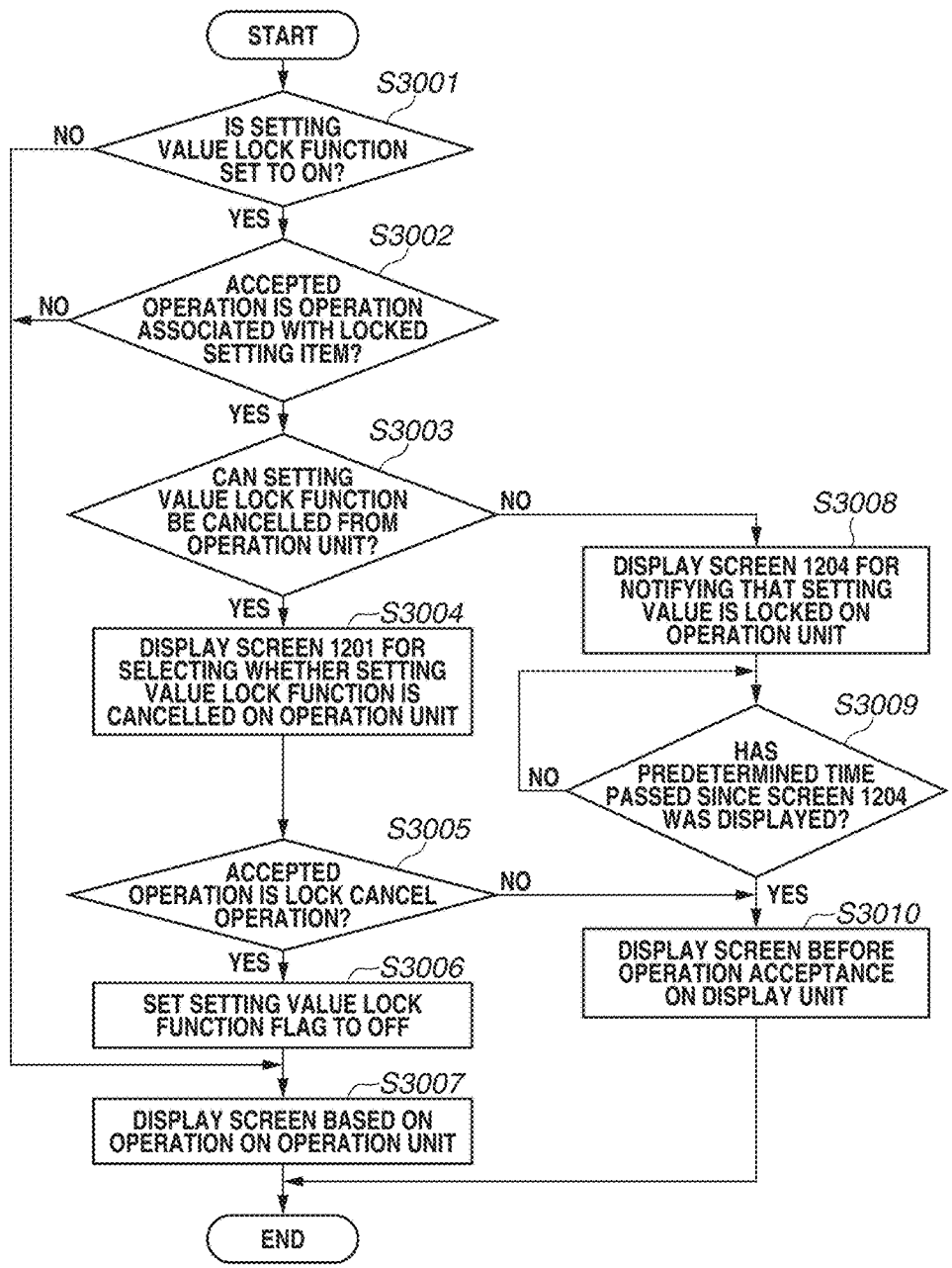
FIG. 19 is a flowchart that illustrates processing in a case where an operation is accepted from a user.

FIG. 19 is a flowchart illustrating processing to be executed in a case where a user sets a setting value. A program for executing the processing in the flowchart is stored in the ROM 104. The CPU 102 executes the program to realize the processing in the flowchart. The flowchart in FIG. 19 is executed in accordance with acceptance of an operation by the CPU 102 from a user. The operation from the user is, for example, the tapping operation.

The CPU 102 determines whether the setting lock function is set to "ON" in step S3001. The CPU 102 determines whether the setting lock function flag 901 stored in the RAM 103 indicates "ON". If the setting lock function flag 901 indicates "OFF" (No in step S3001), the CPU 102 displays on the touch panel 201 a screen associated with the operation from the user accepted via the operation unit 110. For example, if the user taps the "menu" icon 302 on the "home" screen 300, the CPU 102 executes the processing in FIG. 17. Thereafter, the CPU 102 displays the generated "menu" screen 500 on the touch panel 201 in step S3007.

If the setting lock function flag 901 indicates "ON" (Yes in step S3001), the CPU 102 determines whether the accepted operation from the user is an operation associate with an item whose setting has been locked in step S3002. The CPU 102 detects a setting item which has been tapped by the user, based on a position on the touch panel 201 where the tapping has been detected. The CPU 102 refers to a setting lock flag of the setting item on which the tapping has been detected. If the setting lock flag of the setting item which has been tapped is set to "OFF", the processing proceeds to step S3007. For example, if the user has tapped a "facsimile" icon 302 on the "home" screen 300, the CPU 102 determines whether "lock facsimile use" of the function execution lock flag 904 is "ON".

The CPU 102 determines whether the setting lock function can be set to OFF from the operation unit 110 in step S3003. The CPU 102 determines whether the lock cancel from operation unit flag 908 indicates "ON". If the lock cancel from operation unit flag 908 is set to "ON", the CPU 102 displays a screen 1201 in FIG. 15A on the touch panel 201 of the operation unit 110 in step S3004. In the case where the screen 1201 is displayed on the touch panel 201, the user can cancel the setting lock function from the copying machine 100 without connecting to the copying machine 100 from the PC 121.

The CPU 102 determines whether the operation by the user is the cancel of the setting lock function in step S3005. If the tapping on the "Yes" button 1202 of the screen 1201 is detected, the CPU 102 determines that the operation by the user is the cancel of the setting lock function. If the tapping on the "No" button 1203 of the screen 1201 is detected, the CPU 102 determines that the operation by the user is not the cancel of the setting lock function.

If the operation performed by the user is not the cancel of the setting value lock function (No in step S3005), the CPU 102 executes the processing in step S3010.

In step S3005, if the operation performed by the user is determined to be the cancel of the setting lock function (Yes in step S3005), the CPU 102 sets the setting lock function flag 901 to "OFF" in step S3006. Thereafter, the CPU 102 displays a screen based on the detected operation upon start of the processing in FIG. 19 in step S3007. For example, if the user taps the "facsimile" icon 302 on the "home" screen 300, the CPU 102 displays, on the touch panel 201, a "facsimile" screen, which is not illustrated, for setting facsimile transmission or reception.

In step S3003, if the lock cancel from operation unit flag 908 is set to "OFF" (No in step S3003, the CPU 102 displays the screen 1204 in FIG. 15B on the touch panel 201 in step S3008. The CPU 102 determines whether a predetermined time has passed since the screen 1204 was displayed on the touch panel 201 (step S3009). If the predetermined time has passed since the screen 1204 was displayed on the touch panel 201 (Yes in step S3009), the CPU 102 displays on the touch panel 201 a screen displayed on the touch panel 201 before the start of the processing in the flowchart (step S3010). For example, if a user taps the "facsimile" icon 302 on the "home" screen 300, the screen 1204 is displayed for a certain period of time and then the "home" screen 300 is displayed on the touch panel 201.

In the present embodiment, a user can set whether lock of setting can be cancelled from the operation unit of the image processing apparatus connectable to the information processing apparatus. With such a configuration, the image processing apparatus can operate in a mode in which the lock of setting can be cancelled from the operation unit and the information processing apparatus such as a PC and in a mode in which the lock of setting can be cancelled only from the information processing apparatus such as a PC. The user switches the above-descried two operation modes in accordance with an installation environment of the image processing apparatus to be capable of using the image processing apparatus.

Other Embodiments

The present embodiment has described the case where it can be set whether the operation unit 110 of the copying machine 100 can cancel the setting lock function. In another setting method, the operation unit 110 of the copying machine 100 may set, via the PC 121, whether to set use of the setting lock function.

For example, the lock cancel from operation unit flag 908 of the "set lock function" screen 900 in FIG. 9 to appear on the display of the PC 121 is changed into a lock setting from operation unit flag. If the lock setting from operation unit flag is set to "ON", the user can set the setting lock function to ON/OFF through the "lock function" switch 1101 of the "lock function" screen 1100 in FIG. 11. On the other hand, if the lock setting from operation unit flag is set to "OFF", the "lock function" switch 1101 of the "lock function" screen 1100 in FIG. 11 is grayed out. For this reason, the user cannot set the setting lock function to ON/OFF from the image processing apparatus. As a result, the copying machine 100 can operate in a mode where the setting lock function is set to ON/OFF from both the operation unit of the copying machine 100 and the information processing apparatus such as a PC and in a mode where the setting lock function is set to ON/OFF only from the information processing apparatus.

Such a configuration can prevent a situation that after a user sets a setting value sought to be used and sets the setting value lock function to ON, another user cancels the setting value lock function from the operation unit. Further, such a configuration can prevent a situation that a user sets the setting value lock function to ON from the operation unit at a timing unintended by the user.

Further, in the present embodiment, the setting lock function can be always set to ON/OFF from the information processing apparatus such as a PC. It may be selected whether the setting lock function can be set to ON/OFF from the information processing apparatus such as a PC.

For example, besides the setting lock function flag 901, a "lock setting from operation unit flag" and a "lock setting from PC flag" are provided for the "set lock function" screen 900 in FIG. 9. Further, a "lock setting from PC" switch is provided for the "lock function" screen 1100 in FIG. 11. If both the "lock setting from operation unit flag" and the "lock setting from PC flag" are set to ON, a setting of whether the setting lock function is used can be made from the operation unit and the information processing apparatus such as a PC. On the other hand, if the "lock setting from operation unit flag" is set to ON and the "lock setting from PC flag" is set to OFF, the user can set the setting lock function to ON/OFF only on the "lock function" screen 1100 in FIG. 11. The "edit" button 907 of the "set lock function" screen 900 in FIG. 9 to appear on the display of the PC 121 is grayed out, and thus a user cannot click the "edit" button 907. If the "lock setting from operation unit flag" is set to OFF and the "lock setting from PC flag" is set to ON, a use can set the setting lock function to ON/OFF only on the "set lock function" screen 900 to be displayed on the display of the PC 121. The "lock function" switch 1101 of the "lock function" screen 1100 to be displayed on the touch panel 201 is grayed out, and thus the user cannot set the setting lock function to ON/OFF using the "lock function" switch 1101.

Such a configuration allows a user to select a method for setting the setting lock function in accordance with an installation environment of the image processing apparatus. For example, in image processing apparatuses to be installed in shops or public facilities, a setting is made in such a manner that the settings of the setting lock function can be changed only from the information processing apparatus such as a PC. If it is not preferable that the information processing apparatus such as a PC is connected to the image processing apparatus to change setting values, a setting can be made in such a manner that the settings of the setting lock function can be changed only from the operation unit.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of Japanese Patent Application No. 2017-089815, filed Apr. 28, 2017, which is hereby incorporated by reference herein in its entirety.

What is claimed is:

1. An image processing apparatus comprising:
   one or more processors; and
   memory storing instructions that, when executed by the one or more processors, cause the image processing apparatus to perform operations including:
   accepting an operation instruction for the image processing apparatus from an operation unit of the image processing apparatus,
   accepting an operation instruction for the image processing apparatus from an information processing apparatus connected to the image processing apparatus via a network,
   setting a restriction on change in a setting of the image processing apparatus through an operation of the operation unit,
   setting whether to permit cancellation of the restriction setting through an operation of the operation unit,
   making a control in such a way that the cancellation of the restriction setting through an operation of the operation unit is permitted in a case where the cancellation of the restriction setting through an operation of the operation unit is set to be permitted,
   making a control in such a way that the cancellation of the restriction setting through an operation of the operation unit is not permitted in a case where the cancellation of the restriction setting through an operation of the operation unit is set not to be permitted, and
   accepting an instruction to cancel the restriction setting from the information processing apparatus regardless of the setting of whether to permit the cancellation of the restriction setting through an operation of the operation unit.

2. The image processing apparatus according to claim 1, wherein setting the restriction on change includes setting the restriction on change for a setting item selected from among a plurality of setting items.

3. The image processing apparatus according to claim 1, wherein executing the instructions causes the image processing apparatus to perform operations including: displaying on a display unit a screen for giving an instruction of whether to cancel the restriction setting in accordance with an operation on a setting item restricted on change in a setting through an operation of the operation unit in a case where the cancellation of the restriction setting through an operation of the operation unit is set to be permitted.

4. The image processing apparatus according to claim 1, wherein executing the instructions causes the image processing apparatus to perform operations including: notifying that the restriction setting is made, in accordance with an operation on a setting item restricted on change in a setting through an operation of the operation unit in a case where cancellation of the restriction setting through an operation of the operation unit is set not to be permitted.

5. The image processing apparatus according to claim 1, wherein executing the instructions causes the image processing apparatus to perform operations including: graying out a setting item restricted on change in a setting through an operation of the operation unit.

6. A method to control an image processing apparatus configured to accept an operation instruction for the image processing apparatus from an operation unit of the image processing apparatus, and to accept an operation instruction for the image processing apparatus from an information processing apparatus connected to the image processing apparatus via a network, the method comprising:
   setting a restriction on change in a setting of the image processing apparatus through an operation of the operation unit;
   setting whether to permit cancellation of the restriction setting through an operation of the operation unit;
   making a control in such a way that the cancellation of the restriction setting through an operation of the operation unit is permitted in a case where the cancellation of the restriction setting through an operation of the operation unit is set to be permitted;
   making a control in such a way that the cancellation of the restriction setting through an operation of the operation unit is not permitted in a case where the cancellation of the restriction setting through an operation of the operation unit is set not to be permitted; and
   accepting an instruction to cancel the restriction setting from the information processing apparatus regardless of the setting of whether to permit the cancellation of the restriction setting through an operation of the operation unit.

7. A non-transitory computer readable storage medium storing a computer program to cause a computer to perform a method to control an image processing apparatus configured to accept an operation instruction for the image processing apparatus from an operation unit of the image processing apparatus, and to accept an operation instruction for the image processing apparatus from an information processing apparatus connected to the image processing apparatus via a network, the method comprising:
   setting a restriction on change in a setting of the image processing apparatus through an operation of the operation unit;
   setting whether to permit cancellation of the restriction setting through an operation of the operation unit;
   making a control in such a way that the cancellation of the restriction setting through an operation of the operation unit is permitted in a case where the cancellation of the restriction setting through an operation of the operation unit is set to be permitted;
   making a control in such a way that the cancellation of the restriction setting through an operation of the operation unit is not permitted in a case where the cancellation of the restriction setting through an operation of the operation unit is set not to be permitted; and
   accepting an instruction to cancel the restriction setting from the information processing apparatus regardless of the setting of whether to permit the cancellation of the restriction setting through an operation of the operation unit.

* * * * *